Patented May 23, 1933

1,910,176

UNITED STATES PATENT OFFICE

RICHARD MÜLLER AND MARTIN SCHENCK, OF MANNHEIM, GERMANY, ASSIGNORS TO C. F. BOEHRINGER & SOEHNE G. M. B. H., OF MANNHEIM-WALDHOF, GERMANY

CONTROLLING REACTION BETWEEN CELLULOSE AND OTHER REAGENTS

No Drawing. Application filed May 18, 1929, Serial No. 364,310, and in Germany May 22, 1928.

Our invention refers to exothermic reactions between cellulose or its derivatives and other reagents and more particularly to means whereby such reactions can be carried through in a more efficient manner than was hitherto possible.

As is well known to those skilled in the art, reactions occurring between cellulose or its derivatives and other reagents, more especially if loose or porous masses are acted upon by liquids, frequently involve great difficulties in the quick abduction of the heat of reaction and in attaining equalization of heat in different zones of the reacting masses.

We have now found that overheating, throughout the mass as well as locally, can be avoided, if an inert substance, i. e. a substance which does not unfavourably influence the reaction, and which is readily evaporable with consumption of heat, is present in the reaction mixture. We have further found that it may be advantageous to regulate evaporation of this substance by establishing a partial vacuum.

The new process based on this discovery may be explained as follows:

If fibrous material, such as for instance cotton, shall be esterified in accordance with one of the well known methods, without destroying the fibrous structure, higher temperatures must be avoided as far as possible. However, in consequence of the heat developed during the reaction between the esterifying medium and the water contained in the cotton, and of the heat developed in the esterification process itself the temperature is known to rise unduly, so that great difficulties are experienced in practising such process, to avoid the very injurious local overheating of the great reaction masses. If, in accordance with the present invention, a substance which readily evaporates with great consumption of heat, is present in the reaction mixture, for instance by incorporating in this mixture greater quantities of sulphur dioxide, the heat of dilution and reaction developed in the mass will be consumed in the evaporation of the sulphur dioxide and is thereby rendered harmless. The sulphur dioxide gas escaping in the form of gas bubbles at the same time acts as a stirring agent. Inasmuch as the evaporation of the sulphur dioxide will take place in the first line at those places, where the highest temperature prevails and as the consumption of heat is proportional to the evaporation of the sulphur dioxide, we automatically obtain an equalization of heat which causes the temperature to become substantially uniform in the whole heterogenous system.

Our invention is applicable with particular advantage in the production of cellulose derivatives of all kinds and more especially cellulose esters, either mixed or singly.

In practising our invention, for instance in acetylizing cellulose, we may proceed as follows:

100 kilograms of purified linters are placed in a vessel provided for instance with an upper and a lower strainer bottom. Into this vessel is introduced from below the acetylizing liquid, consisting for instance of acetic acid anhydride, to which may be admixed acetic acid and a suitable quantity of one of the catalysts used in such reactions (for instance sulphuric acid). The liquid is saturated, either partially or totally, with sulphur dioxide. In view of the fact that such an acetylizing mixture would tend to dissolve the product of reaction, we prefer adding a substance, which prevents such dissolution. We have found an acetic acid ester to be particularly useful for this purpose, but also other substances, for instance benzene, can be used also. Preferably these additions are also saturated with sulphur dioxide. In the actual practice of the reaction we prefer preparing the acetylizing mixture by first mixing the fluid components and thereafter saturating this mixture with gaseous sulphur dioxide. If the mixture is prepared for instance from 100 parts by weight of acetic acid anhydride, 8 parts acetic acid and 165 parts ethyl acetate, 40% by weight of the mixture of sulphur dioxide or 182 parts are required. Of the mixture thus prepared about 10-15 parts by weight are required per 1 part linters.

The acetylizing mixture thus prepared is quickly forced into the linters from below.

In proportion as the temperature in the reaction vessel rises in consequence of the reaction of the acetylizing mixture with the water in the linters and with the cellulose itself, part of the sulphur dioxide dissolved in the mixture evaporates and in doing so withdraws so much heat from the surrounding mass, that the quantities of heat which might cause an undue or undesirable rise of temperature, are consumed in the form of the heat of evaporation of the sulphur dioxide. As the quantity as well as the rate of evaporation of the sulphur dioxide will adapt themselves to the heat of reaction arising in each individual case, we thus obtain in an automatic manner the results which were hitherto obtained in a more imperfect manner by inner and outer cooling requiring constant regulation and by the aid of powerful mechanical revolving and stirring devices.

The reaction mixture is allowed to stand until the desired acetylation has come to an end. If the character and size of the reaction vessel allows it, we prefer overturning it from time to time.

The gaseous sulphur dioxide escaping from the reaction vessel can either be condensed and recovered by suitable cooling or by applying pressure or both, or it may serve directly for saturating the acetylizing mixture for a subsequent operation.

If reaction vessels are used which allow uniformly distributing the liquid, having for instance the form of rotary drums, the sulphur dioxide condensed in a reflux condenser may be permanently returned into the reaction vessel.

We have found that the equalization of temperature will be expedited if the operation is carried through under slight evacuation.

When the acetylation has come to an end, the liquid is removed by centrifuging and is prepared in a well known manner by fractionation for renewed use. The rinsed and dried acetylation product swells in glacial acetic acid and in acetic acid anhydride and is soluble in chloroform.

While we have described our invention as applied to the treatment of cotton with an acetylizing mixture in the presence of sulphur dioxide, it may of course be applied in the same or in an analogous manner to the treatment of masses of all kinds, for instance to washing, bleaching, mercerizing, impregnating or preserving processes, to the treatment of wool, cotton, other fibrous materials of all kinds, felt, feathers, hides, and other porous or permeable material.

The sulphur dioxide may be replaced, according to the conditions of reaction prevailing in each case, by other substances, such as hydrocarbons, halogenated hydrocarbons, ether and the like.

In many cases readily evaporable substances will be applicable, which, while being innocuous as far as the reaction is concerned, are capable of influencing same favourably either by catalytic action or in some other way.

Various changes may be made in the details disclosed in the foregoing specification without departing from the invention or sacrificing the advantages thereof.

The term "cellulose" as used in the claims is intended to include cellulose derivatives.

We claim:—

1. The method of controlling exothermic reactions between cellulose and a liquid reagent comprising adding to the reaction mixture a highly volatile substance, which does not react with the other constituents of the mixture, and causing abduction of undesirable heat from the reaction mixture by the volatilization of said substance.

2. The method of controlling exothermic reactions between cellulose and a liquid reagent comprising dissolving $SO_2$ in the reaction mixture and causing abduction of undesirable heat from the reaction mixture by the volatilization of the $SO_2$.

3. The method of controlling exothermic reactions between cellulose and a liquid reagent comprising adding to the reaction mixture a highly volatile substance, which does not react with the other constituents of the mixture, creating a partial vacuum above the mixture and causing abduction of undesirable heat from the reaction mixture by the volatilization of said substance.

4. The method of controlling exothermic reactions between cellulose and a liquid reagent comprising dissolving $SO_2$ in the reaction mixture, creating a partial vacuum above the mixture and causing abduction of undesirable heat from the reaction mixture by the volatilization of the $SO_2$.

5. The method of producing a cellulose ester comprising acting on cellulose with an esterifying medium in the presence of a highly volatile substance, which does not react with the other constituents of the mixture, and causing abduction of undesirable heat from the reaction mixture by the volatilization of said substance.

6. The method of producing a cellulose ester comprising acting on cellulose with an esterifying medium in the presence of a highly volatile substance, which does not react with the other constituents of the mixture, creating a partial vacuum above the mixture and causing abduction of undesirable heat from the reaction mixture by the volatilization of said substance.

7. The method of producing a cellulose ester comprising mixing cellulose with an esterifying medium, in which $SO_2$ is dissolved and causing abduction of undesirable heat from the reaction mixture by the volatilization of the $SO_2$.

8. The method of producing a cellulose ester comprising mixing cellulose with an esterifying medium, in which $SO_2$ is dissolved, creating a partial vacuum above the mixture and causing abduction of undesirable heat from the reaction mixture by the volatilization of the $SO_2$.

9. The method of producing a mixed cellulose ester comprising mixing cellulose with two esterifying media, in which $SO_2$ is dissolved, creating a partial vacuum above the mixture and causing abduction of undesirable heat from the reaction mixture by the volatilization of the $SO_2$.

10. The method of producing cellulose acetate comprising mixing an acetylizing agent, in which $SO_2$ is dissolved, with cellulose, and causing abduction of heat from the reaction mixture by the volatilization of the $SO_2$.

11. The method of producing cellulose acetate comprising mixing an acetylizing agent, in which $SO_2$ is dissolved, with cellulose, creating a partial vacuum above the mixture and causing abduction of heat from the reaction mixture by the volatilization of the $SO_2$.

12. The method of producing a cellulose ester comprising mixing cellulose with an esterifying agent, in which $SO_2$ is dissolved, and a substance capable of preventing dissolution of the ester in the solution of $SO_2$ in said agent and causing abduction of undesirable heat from the reaction mixture by the volatilization of the $SO_2$.

13. The method of producing a cellulose ester comprising mixing cellulose with an esterifying medium, in which $SO_2$ is dissolved, and an ester, and causing abduction of undesirable heat from the reaction mixture by the volatilization of the $SO_2$.

14. The method of producing cellulose acetate comprising mixing an acetylizing agent, in which $SO_2$ is dissolved, with cellulose and a substance capable of preventing dissolution of the ester in the solution of $SO_2$ in said agent and causing abduction of heat from the reaction mixture by the volatilization of the $SO_2$.

15. The method of producing cellulose acetate comprising mixing an acetylizing agent, in which $SO_2$ is dissolved, with cellulose and an ester, and causing abduction of heat from the reaction mixture by the volatilization of the $SO_2$.

16. The method of producing cellulose acetate comprising mixing an acetylizing agent, in which $SO_2$ is dissolved, with cellulose and an ester of acetic acid, and causing abduction of heat from the reaction mixture by the volatilization of the $SO_2$.

17. The method of producing a cellulose ester comprising mixing cellulose with an esterifying medium, in which $SO_2$ is dissolved, and benzene, and causing abduction of undesirable heat from the reaction mixture by the volatilization of the $SO_2$.

18. The method of controlling exothermic reactions between cellulose and a liquid reagent comprising adding to such agent a highly volatile substance, which does not react with the other constituents of the mixture, and a catalyst, and causing abduction of undesirable heat from the reaction mixture by the volatilization of said substance.

19. The method of producing cellulose acetate comprising mixing cellulose with acetic acid anhydride, in which $SO_2$ is dissolved, and a catalyst, and causing abduction of undesirable heat from the reaction mixture by the volatilization of the $SO_2$.

20. The method of producing cellulose acetate comprising mixing cellulose with acetic acid anhydride and an ester of acetic acid, in which $SO_2$ is dissolved, and with a catalyst, and causing abduction of undesirable heat from the reaction mixture by the volatilization of the $SO_2$.

21. The method of producing cellulose acetate comprising mixing a cotton product with about 10–15 parts of a mixture of about 100 parts acetic acid anhydride, 8 parts acetic acid and 165 parts ethyl acetate, in which $SO_2$ is dissolved, and causing abduction of undesirable heat from the reaction mixture by the volatilization of the $SO_2$.

In testimony whereof we affix our signatures.

RICHARD MÜLLER.
MARTIN SCHENCK.